United States Patent [19]

Saito et al.

[11] Patent Number: 5,204,432

[45] Date of Patent: Apr. 20, 1993

[54] SILICONE RESIN FINE POWDER CONTAINING QUATERNARY AMMONIUM GROUP

[75] Inventors: Kenji Saito; Hiroshi Kimura, both of Gunma, Japan

[73] Assignee: Toshiba Silicone Co., Ltd., Tokyo, Japan

[21] Appl. No.: 340,354

[22] Filed: Apr. 19, 1989

[30] Foreign Application Priority Data

Apr. 19, 1988 [JP] Japan .................................. 63-94547

[51] Int. Cl.$^5$ .............................................. C08G 77/26
[52] U.S. Cl. ........................................ 528/10; 528/28; 528/38
[58] Field of Search .............................. 528/10, 28, 38

[56] References Cited

U.S. PATENT DOCUMENTS

| | | | |
|---|---|---|---|
| 2,972,598 | 2/1961 | Morehouse | 525/474 |
| 4,377,675 | 6/1981 | Daudt . | |
| 4,410,669 | 10/1983 | Panster et al. | 525/474 |
| 4,424,297 | 1/1984 | Bey | 524/714 |

FOREIGN PATENT DOCUMENTS

| | | |
|---|---|---|
| 20151991 | 1/1985 | Fed. Rep. of Germany . |
| 3800564 | 3/1989 | Fed. Rep. of Germany . |
| 956276 | 4/1964 | United Kingdom . |
| 1093556 | 12/1965 | United Kingdom . |
| 1215328 | 12/1967 | United Kingdom . |
| 10090577 | 3/1983 | United Kingdom . |

*Primary Examiner*—Melvyn I. Marquis
*Assistant Examiner*—R. Dean, Jr.
*Attorney, Agent, or Firm*—Sughrue, Mion, Zinn, Macpeak & Seas

[57] ABSTRACT

A silicone resin fine powder containing a quaternary ammonium group-containing organofunctional group and having excellent physiological activity, hydrophilicity and polarity, which comprises units represented by $RSiO_{3/2}$ wherein R represents a substituted or unsubstituted monovalent hydrocarbon group, and additionally at least one of units represented by $SiO_2$ and units represented by RSiO wherein R is the same as defined above.

4 Claims, 3 Drawing Sheets

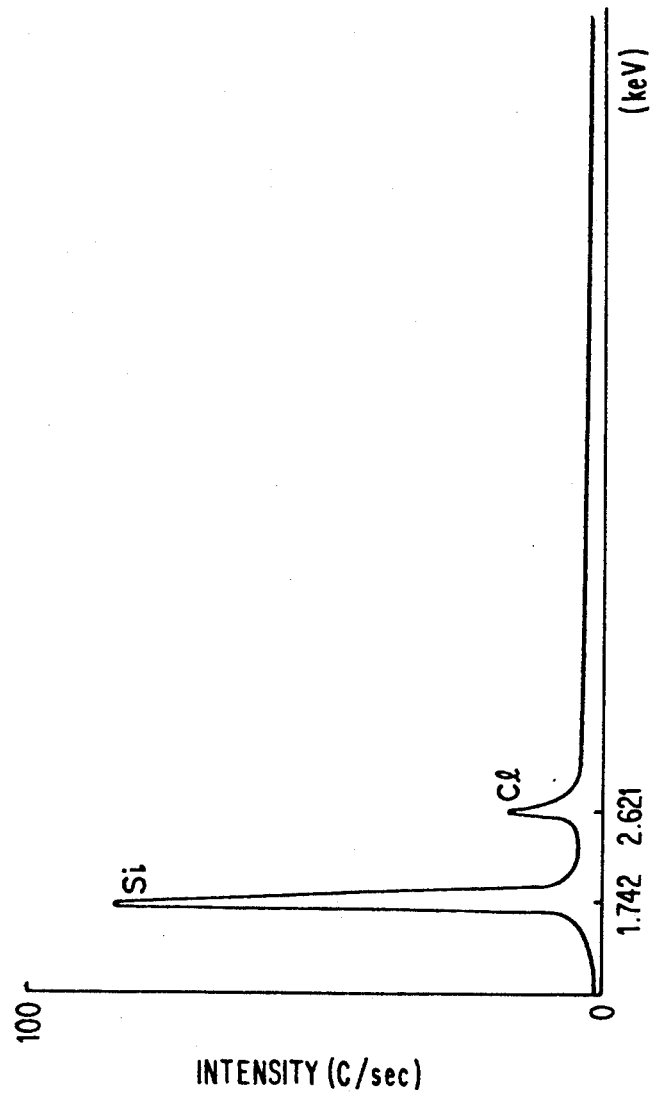

SILICONE RESIN FINE POWDER CONTAINING QUATERNARY AMMONIUM GROUP

FIELD OF THE INVENTION

This invention reltes to a silicone resin fine powder containing a quaternary ammonium group-containing organofunctional group and having physiological activity, hydrophilicity and polarity.

BACKGROUND OF THE INVENTION

It is well known that polymethylsilsesquioxane is a polymer comprising methylsilsesquioxane units which are trifunctional organosilicon units, and can take a fine powder form. The present inventors previously found a method for the preparation of a polymethylsilsesquioxane fine powder suitable as a material for electronic parts and an additive for polymers as disclosed in, for example, JP-A-63-77940 and 63-295637 (The term "JP-A" as used herein means an "unexamined published Japanese patent application").

Such a silicone resin fine powder comprising methylsilsesquioxane units is composed of minute spherical particules usually having a particle diameter of 0.05 to 100 μm, and has advantages over silica in having a smaller specific gravity and better slip properties and being excellent in dispersibility into organic resins and organic liquids. However, there has not yet been obtained a silicone resin fine powder in which a hydrocarbon group substituted with a quaternary ammonium group is bonded to a silicone atom.

Since polymethylsilsesquioxane does not have a polar group in its molecule, it is not suitable for applications for which reactivity and appropriate hydrophilicity are required. Further, introduction of a physiologically active group into the polymer has not yet been successful.

On the other hand, a technique for obtaining spherical silica is known, which comprises subjecting a tetraalkoxysilane to hydrolytic polycondensation in alcohol containing aqueous ammonia, and JP-A-62-72514 discloses a method for introducing an organofunctional group by replacing part of the tetraalkoxysilane with an organotrialkoxysilane. However, this prior art reference fails to disclose introduction of an organofunctional group containing a quaternary ammonium group, this introduction being a characteristic feature of this invention, and further there is no description therein teaching or suggesting the application of such a fine powder to a coating composition etc., with the fine powder dispersed in an organic resin or organic liquid.

SUMMARY OF THE INVENTION

Accordingly, an object of the present invention is to provide a silicone resin fine powder containing a quaternary ammonium group-containing organofunctional group and having excellent physiological activity, hydrophilicity and polarity.

BRIEF DESCRIPTION OF THE DRAWINGS

FIG. 3 is an X-ray microanalyzer chart for the silicone resin fine powder of this invention as prepared in Example 1.

DETAILED DESCRIPTION OF THE INVENTION

Figure 1:
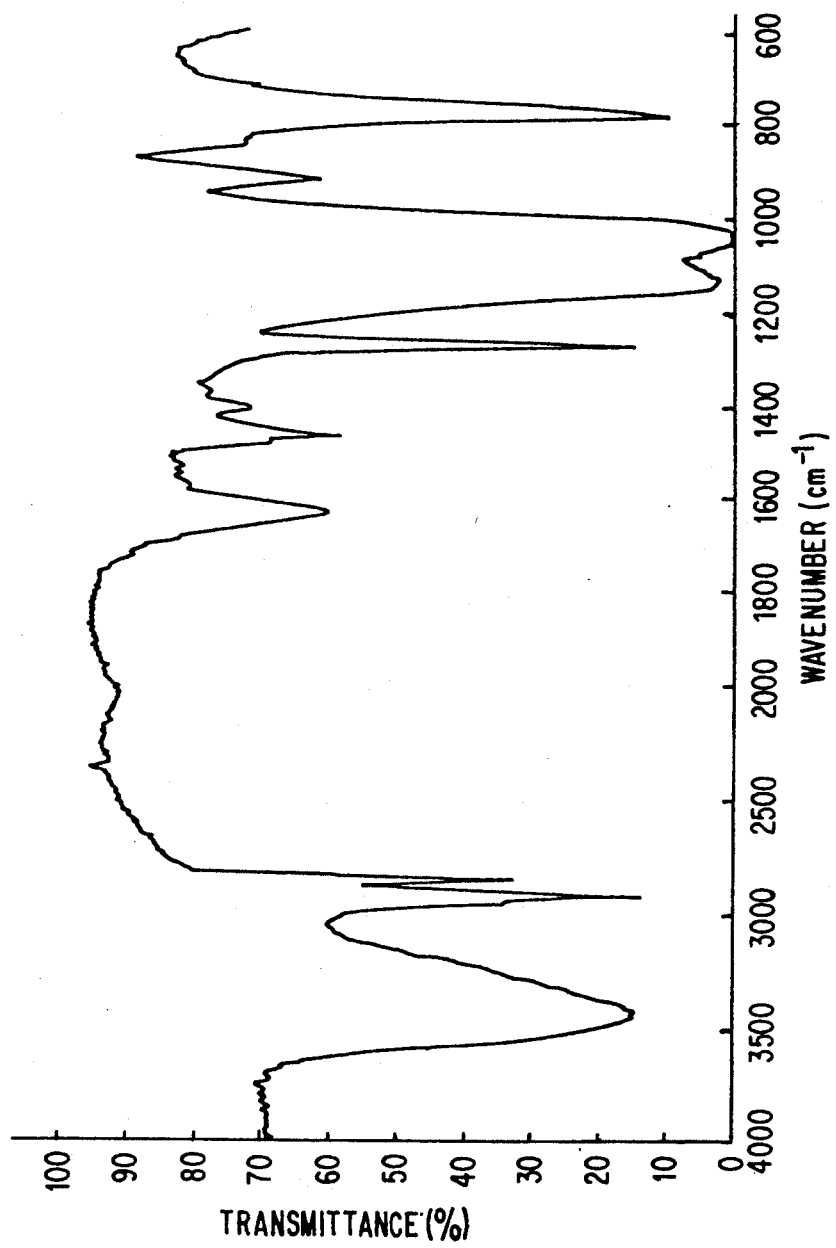
FIG. 1 is an infrared spectrum for the silicone resin fine powder of this invention as prepared in Example 1, the spectrum being obtained by the KBr tablet method.

The quaternary ammonium group-containing silicone resin fine powder of the present invention is composed of minute particles of a silicone resin which comprises units represented by $RSiO_{3/2}$ wherein R represents a substituted or unsubstituted monovalent hydrocarbon group or comprises units represented by $RSiO_{3/2}$ wherein R is the same as defined above and units represented by $SiO_2$, 0.1 to 100 mole % of the groups represented by R in the molecule of the silicone resin being an organofunctional group containing a quaternary ammonium group.

In another embodiment of this invention, the silicone resin fine powder containing a quaternary ammonium group-containing organofunctional group is such that the silicone resin further comprises as constituent units 20 mole % or less of units represented by $R_2SiO$, wherein R is the same as defined above.

That is, the silicone resin fine powder containing a quaternary ammonium group-containing organofunctional group (hereinafter, referred to as "silicone resin fine powder") of the present is made of:

a homopolymer of units represented by $RSiO_{3/2}$;

a copolymer of units represented by $RSiO_{3/2}$ and units represented by $SiO_2$;

a copolymer of units represented by $RSiO_{3/2}$ and units represented by $R_2SiO$; or a copolymer of units represented by $RSiO_{3/2}$ units represented by $SiO_2$ and units represented by $R_2SiO$.

In the case where the silicone resin fine powder of this invention comprises a copolymer of $RSiO_{3/2}$ units and $SiO_2$ units, the proportion of the constituent units of each type is not particularly limited and may be suitably decided according to application.

In the case where the silicone resin fine powder of this invention comprises a copolymer containing $RSiO_{3/2}$ units and $R_2SiO$ units, or a copolymer containing $RSiO_{3/2}$ units, $SiO_2$ units and $R_2SiO$ units, the proportion of the $R_2SiO$ units is 20 mole % or less. If this proportion is more than 20 mole %, it is difficult for the copolymer to take a fine powder form.

In the units constituting the polymer molecule of the silicone resin fine powder according to the present invention, at least 0.1 mole % of the groups represented by R are a quaternary ammonium group-containing organofunctional group. This incorporation of an organofunctional group containing a quaternary ammonium group serves to impart physiological activity, hydrophilicity and polarity to the silicone resin fine powder of this invention. Hence, if the proportion of the quaternary ammonium group-containing organofunctional group is less than 0.1 mole %, the desired physiological activity etc. cannot be obtained. The preferred proportion of the quaternary ammonium group-containing organofunctional group is from 1 to 50 mole %.

From the standpoint of easy synthesis, the preferred quaternary ammonium group-containing organofunctional group is a group represented by the general formula:

$(R^1)_3N^+Q^1-$ or $(R^1)_3N^+Q^2NHQ^1-$
$X^-$ $X^-$ wherein $R^1$ represents an alkyl group, $Q^1$ represents an alkylene group having 3 to 6 carbon atoms, $Q^2$ represents an alkylene group having 2 to 4 carbon atoms, and $X^-$ represents an anion.

The three $R^1$'s in each general formula may be either the same or different, and examples of $R^1$ include methyl, ethyl, propyl, butyl, pentyl, hexyl, octyl, decyl, dodecyl, tetradecyl, hexadecyl, octadecyl, eicosyl, etc. From the standpoint of easy synthesis, it is preferred that at least two of the three $R^1$'s bonded to the nitrogen atom be methyl. In this case, the remaining one $R^1$ is preferably an alkyl group having 12 to 18 carbon atoms because of the easy availability of raw materials.

Examples of $Q^1$, an alkylene group having 3 to 6 carbon atoms, include trimethylene, tetramethylene, pentamethylene and hexamethylene. Of these, a trimethylene group is preferred because of its easy synthesis and handling.

Examples of $Q^2$, an alkylene group having 2 to 4 carbon atoms, include ethylene, trimethylene and tetramethylene.

Examples of X which forms the anion $X^-$ include chlorine, bromine or iodine. Of these, a chlorine atom is preferred because raw materials therefor are easily available and handled.

In the case where the quaternary ammonium group-containing organofunctional group is a group having two nitrogen atoms, either of the two may be the quaternary ammonium group.

Various quaternary ammonium group-containing organofunctional groups can be used. However, the following are preferred examples because of their easy syntheses, high physiological activities and strong polarities.

(a) $(R^1)_3N^+Q^1-$;

$(CH_3)_3N^+C_3H_6-$ $C_6H_{13}(CH_3)_2N^+(CH_2)_3-$ $C_{12}H_{25}(CH_3)_2N^+(CH_2)_3-$ $C_{14}H_{29}(CH_3)_2N^+(CH_2)_3-$ $C_{16}H_{33}(CH_3)_2N^+(CH_2)_3-$ $C_{18}H_{37}(CH_3)_2N^+(CH_2)_3-$ (b) $(R^1)_3N^+Q^2NHQ^1-$;

$(CH_3)_3N^+C_2H_4NH(CH_2)_3-$ $C_{18}H_{37}(CH_3)_2N^+C_2H_4NH(CH_2)_3-$

Other preferred examples of R in the constituting units than the above-described quaternary ammonium group-containing organofunctional groups include an alkyl group such as methyl, ethyl, propyl, butyl, pentyl and hexyl, and phenyl. Of these, methyl and phenyl are more preferred since those two groups impart excellent heat resistance to the final silicone resin fine powder. Most preferred of the two is methyl because of the easy synthesis of the polymer. Further, an amino group-containing group, such as γ-aminopropyl, N-methyl-γ-aminopropyl, N-phenyl-γ-aminopropyl or N-(β-aminoethyl)-γ-aminopropyl, can be incorporated as the group of R.

The silicone resin fine powder of the present invention can be obtained by subjecting an alkoxysilane alone having a quaternary ammonium group-containing organofunctional group or a mixture of the above alkoxysilane and other hydrolyzable alkylsilicate or alkylalkoxysilicate wherein the "alkyl" is not organofunctional to hydrolysis (cohydrolysis).

As the alkoxysilane having a quaternary ammonium group-containing organofunctional group, it is preferred to employ a trialkoxysilane having one quaternary ammonium group-containing organofunctional group and/or a dialkoxysilane having one quaternary ammonium group-containing organofunctional group and one methyl group, because of easy availability of raw materials. The preferred alkoxy group is methoxy or ethoxy, and especially methoxy, because their reaction rates in hydrolysis are high. In the case where the quaternary ammonium group is $[C_{18}H_{37}(CH_3)_2N^+(CH_2)_3-]$, representative examples of such alkoxysilane are as follows.

$[C_{18}H_{37}(CH_3)_2N^+(CH_2)_3Si(OCH_3)_3]Cl^-$ $[C_{18}H_{37}(CH_3)_2N^+(CH_2)_3SiCH_3(OCH_3)_2]Cl^-$ $[C_{18}H_{37}(CH_3)_2N^+(CH_2)_3Si(OC_2H_5)_3]Cl^-$

Examples of the alkoxysilane having no quaternary ammonium group-containing group include tetraalkoxysilanes such as methyl orthosilicate, ethyl orthosilicate, isopropyl orthosilicate and butyl orthosilicate; organotrialkoxysilanes such as methyltrimethoxysilane, methyltriethoxysilane, methyltriisopropoxysilane, hexyltrimethoxysilane and phenyltrimethoxysilane; and diorganodialkoxysilanes such as dimethyldimethoxysilane and dimethyldiethoxysilane. Of these, ethyl orthosilicate and methoxysilanes are preferred because of their property of being moderately hydrolyzed.

Further, an amino group-containing organofunctional silane such as γ-aminopropyltrimethoxysilane, γ-aminopropyltriethoxysilane, N-methyl-γ-aminopropyltrimethoxysilane, N-phenyl-γ-aminopropyltrimethoxysilane or N-(β-aminoethyl)-γ-aminopropyltrimethoxysilane may be used in combination with the above-described alkoxysilane.

Those alkoxysilanes are subjected, directly or after being converted into the corresponding silanol compounds through hydrolysis, to polycondensation in water or a mixed solution of water and an alcohol in the presence of a compound such as ammonia whose aqueous solution is alkaline, thereby to obtain an intended fine powder of a silicone resin having a quaternary ammonium group-containing organofunctional group. This hydrolysis is preferably conducted in the presence of an organic acid such as acetic acid. According to need, plural kinds of alkoxysilanes may be mixed with each other in desired proportions, the resulting blend being subjected to cohydrolysis, or may be separately subjected to hydrolysis to obtain aqueous solutions of silanol compounds, the resulting solutions being mixed with each other before being subjected to polycondensation. The conditions for the hydrolysis and polycondensation are not especially limited. Although the conditions are varied depending upon the kinds of the above-described alkoxysilanes and the method of hydrolysis, the reaction temperature, for example, may be in the range of from −20° to 150° C., preferably from −5° to 80° C. The time for the polycondensation is generally in the range of from a few minutes to about 40 hours.

Under the conditions as explained above, a silicone resin fine powder of the present invention which contains a quaternary ammonium group-containing organofunctional group can be obtained. The average particle diameter of this fine powder does not exceed 100 μm, and a preferred range of the average particle diameter may be selected according to the purpose of use. For example, in the case where the fine powder is used to disperse into a liquid phase, the preferred average particle diameter is in the range of from 0.05 to 20 μm. If a fine powder having an average particle diameter less than 0.05 μm is dispersed into a liquid, the viscosity of the dispersion becomes too high, resulting in difficulty in handling of the dispersion. If it exceeds 20 μm, the stability of the resulting dispersion is insufficient.

The silicone resin fine powder of the present invention has an appropriate hydrophilicity due to the quaternary ammonium group-containing organofunctional group which has been incorporated in the silicone molecule, while retaining such characteristics of the polymethylsilsesquioxane fine powder as a small specific gravity and good slip properties as compared with silica. Further, the silicone resin fine powder of the present invention can be formed to have a desired hydrophilicity, since the kind and proportion of the quaternary ammonium group-containing organofunctional group can be freely controlled by suitably selecting or varying the kinds and proportions of the starting material silanes. As well as having such hydrophilicity, the silicone resin fine powder of this invention shows excellent physiological activity. Hence, the fine powder can be advantageously used, for example, as a filler for marine paints and a treating agent for fish nettings in order to prevent adhesion of marine organisms to the bottoms of ships and to fish nettings. Furthermore, taking advantage of the polarity and hydrophilicity due to the quaternary ammonium group-containing organofunctional group, the silicone resin fine powder can also be used as a treating agent for toners, a material for adhesives, a hardener and filler for resins, a dispersed phase in an electroviscous liquid, etc.

The present invention will be illustrated in more detail by reference to the following Examples, Reference Example, Application Examples and Comparative Examples, which should not be construed to be limiting the scope of the invention. In the examples, all percents, parts and the like are by weight unless otherwise indicated.

EXAMPLE 1

A hydrolyzing agent was prepared by uniformly mixing 300 parts of water, 300 parts of methanol and 10 parts of 28% ammonia water. To this hydrolyzing agent was added, with stirring at 30° C., 450 parts of a mixture prepared from 300 parts of a methanol solution containing 40% octadecyldimethyl(trimethoxysilylpropyl)ammonium chloride and 150 parts of methyltrimethoxysilane. The resulting mixture was then kept stirred at 30° C. As a result, a fine powdery polymethylsilsesquioxane was formed and the reaction mixture became white turbid. 24 Hours later, the fine powder formed was suction-filtered off using a filler paper, and dried in a drying oven having a temperature of 150° C., thereby obtaining 186 parts of a fine powder of polymethylsilsesquioxane having a quaternary ammonium group-containing organofunctional group.

The yield of the powder based on the theoretical value was 99%. Electron microscopy revealed that the average particle diameter was 8 μm.

The fine powder thus obtained was subjected to the following identification tests.

Infrared Spectroscopy

Figure 2:
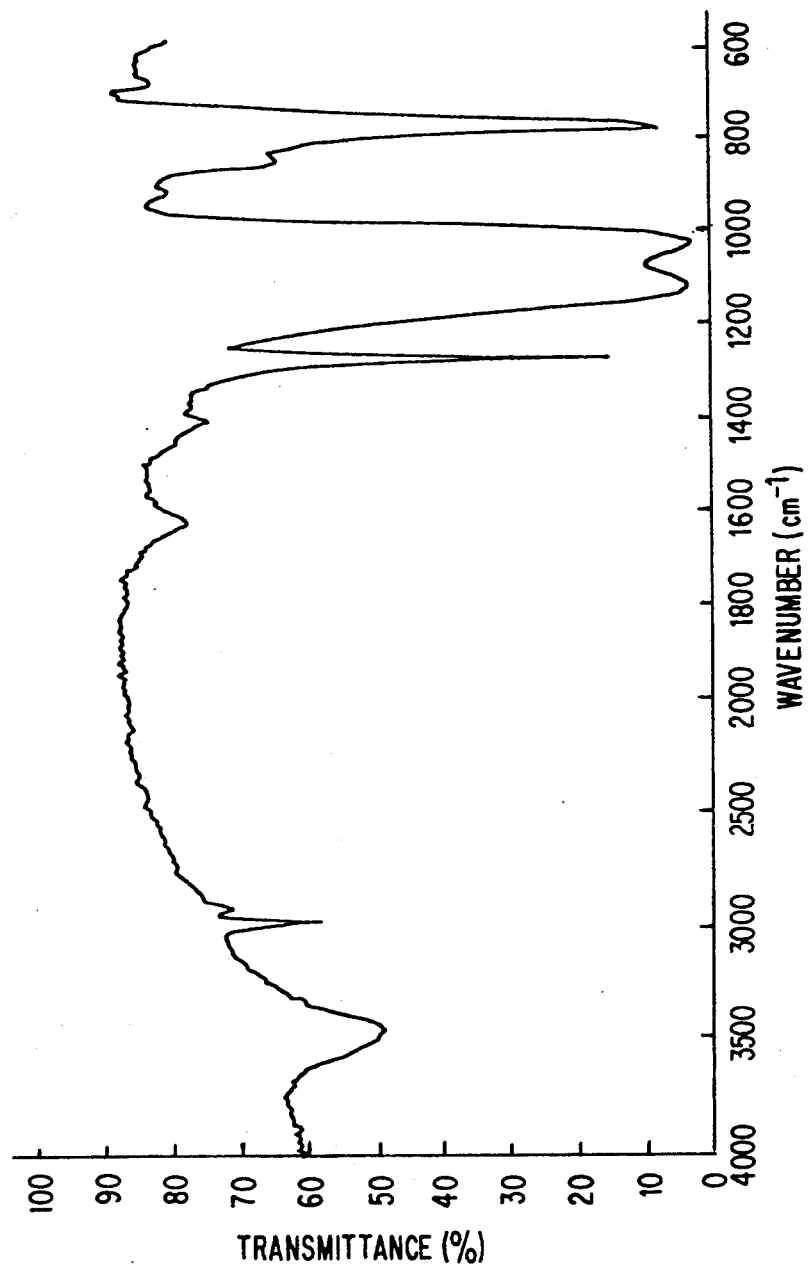
FIG. 2 is an infrared spectrum for a polymethylsilsesquioxane fine powder, the spectrum being obtained by the KBr tablet method.

Infrared spectroscopy was performed on the thus-obtained fine powder according to the KBr tablet method. The infrared spectrum obtained is shown in FIG. 1, which shows an absorption peak at 1470 cm$^{-1}$ due to an alkylene group. For comparison, the same infrared spectroscopy was performed on a fine powder of polymethylsilsesquioxane and its infrared spectrum is shown in FIG. 2, which shows no absorption peak at 1470 cm$^{-1}$.

Elemental Analysis by ESCA

According to the ESCA method, elemental analysis was performed on the above-obtained fine powder. As a result, peaks due to C, Si, O, N and Cl were observed, and those peaks had the following relative intensities, which were almost in agreement with the theoretical values.

|  | C | Si | O | N | Cl |
|---|---|---|---|---|---|
| Found value | 4.85 | 1.00 | 1.50 | 0.18 | 0.16 |
| Theoretical value | 5.0 | 1.0 | 1.5 | 0.18 | 0.18 |

Elemental Analysis by XMA

Using an X-ray microanalyzer, elemental analysis was performed on the above-obtained fine powder. An XMA chart obtained is shown in FIG. 3, which shows two peaks. The relative intensity of the peak of Cl to that for Si was 0.18, which coincided with the theoretical value (0.18).

Weight Loss on Heating

Using a differential thermal balance, the above-obtained fine powder was heated to 900° C. at a heating rate of 5° C./min and then kept at that temperature for 1 hour, to obtain a percentage of weight loss due to pyrolysis. As a result, the percentage of weight loss was 53.0%, which almost coincided with the theoretical value (54.4%). For comparison, the weight loss of the same polymethylsilsesquioxane as used in Comparative Application Example 1 was measured under the same conditions as above. As a result, its percentage of weight loss was 11.0% (theoretical value: 10.4%).

EXAMPLES 2 TO 4

Fine powders of silicone resins having in their molecules a quaternary ammonium group-containing organofunctional group were obtained in the same manner as in Example 1 except that the compositions and reaction times were varied as shown in Table 1. The amount, the yield based on the theoretical value, and the average particle diameter of each of the fine powders obtained are shown in Table 1.

TABLE 1

|  | Example 2 | Example 3 | Example 4 |
| --- | --- | --- | --- |
| Composition (part) | | | |
| Water | 250 | 500 | 500 |
| Methanol | 350 | 100 | 100 |
| 28% Ammonia water | 10 | 10 | 10 |
| Octadecyldimethyl(trimethoxy-silylpropyl)ammonium chloride (40% methanol solution) | 300 | 300 | — |
| Octadecyldimethyl-2-[(3-tri-methoxysilyl)propylamino]ethyl-ammonium chloride | — | — | 150 |
| n-(β-Aminoethyl)-γ-amino-propyltrimethoxysilane | 13 | — | — |
| Methyltrimethoxysilane | 150 | — | 150 |
| Ethyl orthosilicate | — | 250 | — |
| Reaction time (hr) | 96 | 24 | 96 |
| Amount obtained (part) | 178 | 170 | 122 |
| Yield (based on theoretical, %) | 95 | 97 | 96 |
| Average particle diameter (μm) | 8 | 5 | 10 |

EXAMPLE 5

Step 1

Into a reaction vessel equipped with a thermometer, a reflux condenser and a stirrer were introduced 1,118 parts of water, and 0.2 part of glacial acetic acid was then added thereto. The resulting mixture was stirred to obtain a uniform solution. Thereafter, to the resulting solution was added, with stirring at 30° C., 1,423 parts of a liquid mixture prepared from 1,360 parts of methyl-trimethoxysilane and 63 parts of dimethyldimethoxysi-lane. As a result, hydrolysis proceeded and the temperature of the reaction system was raised to 55° C. in 30 minutes, thereby obtaining a colorless transparent reaction liquid. The stirring was continued for another 12 hours, and the resulting reaction liquid was filtered to obtain a silanol solution.

Step 2

1,950 Parts of water and 50 parts of 28% aqueous ammonia solution were mixed uniformly. To the resulting solution was added, with stirring at 30° C., a liquid mixture of 500 parts of the silanol solution as obtained Step 1 and 500 parts of a methanol solution containing 40% octadecyldimethyl(trimethoxysilylpropyl)ammonium chloride. As a result, a fine powdery silicone resin was formed and the reaction mixture became white turbid. 24 hours later, the fine powder formed was filtered off using a filter paper, and dried in a drying oven having a temperature of 105° C., thereby obtaining 306 parts of a silicone resin fine powder. The yield based on the theoretical value was 95%. This dried fine powder was pulverized to obtain a fine powder having an average particle diameter of 10 μm.

REFERENCE EXAMPLE

A solution was prepared by mixing 30 parts of methyl isobutyl ketone, 10 parts of xylene and 10 parts of toluene. To this solution were added 10 parts of a vinyl chloride resin and 20 parts of rosin, and the resulting mixture was stirred until the solids were dissolved uniformly, thereby obtaining a vehicle for coating compositions.

APPLICATION EXAMPLES 1 TO 4

Preparation of Steel Plates for Anti-fouling Test

A rolled steel plate, as specified in JIS G 3141, having a thickness of 1 mm and a length and a width of 30 cm each was coated with a rust-colored "SUBOID" primer (manufactured by Dai Nippon Toryo Co., Ltd.) in a thickness of 50 to 60 μm, and then left at room temperature for 24 hours. Thereafter, the resulting steel plate was further coated with a white-colored "ACRYLMARINE" intercoat (manufactured by Dai Nippon Toryo Co., Ltd.) in a thickness of 25 to 30 μm, and then left for 24 hours, thereby preparing a steel plate for use in an anti-fouling test given below.

Preparation of Coating Compositions

Using the vehicle obtained in Reference Example and the fine powders of silicone resins each having a quaternary ammonium group-containing organofunctional group, obtained in Examples 1 to 5, coating compositions were prepared according to the formulations as shown in Table 2.

TABLE 2

|  | Application Example 1 | Apppli-cation Example 2 | Application Example 3 | Application Example 4 | Application Example 5 |
| --- | --- | --- | --- | --- | --- |
| Formulation (part) | | | | | |
| Silicone resin fine powder of each Example | 100 (Example 1) | 100 (Example 2) | 100 (Example 3) | 100 (Example 4) | 100 (Example 5) |
| Vehicle | 200 | 200 | 200 | 200 | 200 |
| Red iron oxide | 30 | 30 | 30 | 30 | 30 |
| Methyl isobutyl ketone | 50 | 50 | 50 | 50 | 50 |

Stability Test

The coating compositions thus prepared were allowed to stand at room temperature for a week. As a result, no sedimentation of silicone resin fine powder or red iron oxide was observed, and all the coating compositions maintained their uniform states.

Anti-fouling Test

The steel plates on which primer and intercoat layers had been formed, as described above, were separately coated with the coating compositions prepared above in a thickness of 100 μm, and then left at room temperature for 24 hours. Thus, test pieces were prepared.

Those test pieces were immersed in the seawater for 6 months, and then checked for fouling and damage due to adhesion of marine organisms. As a result, almost no fouling or damage was observed on all the test pieces.

COMPARATIVE APPLICATION EXAMPLE 1

A coating composition was prepared and a stability test and an anti-fouling test were performed in the same manner as in Application Examples 1 to 5 except that 30 parts of polymethylsilsesquioxane fine powder was used in place of the fine powder of a quaternary ammonium group-containing silicone resin. As a result, the thus-obtained coating composition showed good stability, whereas in the anti-fouling test, adhesion of marine organisms was observed over almost all the surfaces.

COMPARATIVE APPLICATION EXAMPLE 2

A coating composition was prepared in the same manner as in Application Examples 1 to 5 except that 2.5 parts of cuprous oxide was used in place of the fine powder of a quaternary ammonium group-containing silicone resin and the amount of the vehicle was changed to 100 parts. The coating composition thus obtained was allowed to stand for a week. As a result, all the cuprous oxide sedimented, forming a hard cake.

Meanwhile, another coating composition was prepared in the same manner as just above except that 2 parts of bentonite was incorporated further. Its stability was tested, and sedimentation of cuprous oxide was still observed.

COMPARATIVE APPLICATION EXAMPLE 3

The steel plate on which primer and intercoat layers had been formed was subjected to the anti-fouling test with the intercoat layer exposed. As a result, the plate was remarkably fouled and damaged.

While the invention has been described in detail and with reference to specific embodiments thereof, it will be apparent to one skilled in the art that various changes and modifications can be made therein without departing from the spirit and scope thereof.

What is claimed is:

1. A silicone resin fine powder comprising units represented by $RSiO_{3/2}$, wherein from 1 to 50 mole % of the groups represented by R in the molecule of said silicone resin are a substituted monvalent organofunctional group containing a quaternary ammonium group represented by the formula:

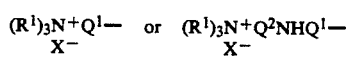

wherein $R^1$ represents an alkyl group, $Q^1$ represent an alkylene group having 3 to 6 carbon atoms, $Q^2$ represents an alkylene group having 2 to 4 carbon atoms, and $X^-$ represents anion and the remainder of the groups represented by R in the molecule of said silicone resin are methyl.

2. A silicone resin fine powder as claimed in claim 1, further comprising as constituent units up to 20 mole % of units represented by $R_2SiO$, wherein R is the same as defined in claim 1, at least some of said $R_2SiO$ units being present.

3. A silicone resin fine powder as claimed in claim 1, further comprising units represented by $SiO_2$.

4. A silicone resin fine powder as claimed in claim 3, further comprising as constituent units up to 20 mole % of units represented by $R_2SiO$, wherein R is the same as defined in claim 1, at least some of said $R_2SiO$ units being present.

* * * * *